(12) United States Patent
Alsio et al.

(10) Patent No.: US 7,092,785 B2
(45) Date of Patent: Aug. 15, 2006

(54) DATA INPUT DEVICE

(76) Inventors: Gunilla Alsio, Katrinebergsbacken 16, 117 61 Stockholm (SE); Lars Asplund, Jakobsgatan 23, 724 62 Västerås (SE)

( * ) Notice: Subject to any disclaimer, the term of this patent is extended or adjusted under 35 U.S.C. 154(b) by 95 days.

(21) Appl. No.: 10/507,394

(22) PCT Filed: Jan. 31, 2003

(86) PCT No.: PCT/US03/02904

§ 371 (c)(1),
(2), (4) Date: Sep. 10, 2004

(87) PCT Pub. No.: WO03/079141

PCT Pub. Date: Sep. 25, 2003

(65) Prior Publication Data

US 2005/0179644 A1    Aug. 18, 2005

Related U.S. Application Data

(60) Provisional application No. 60/363,792, filed on Mar. 12, 2002.

(51) Int. Cl.
*G06F 19/00* (2006.01)
(52) U.S. Cl. ............... 700/168; 700/258; 700/84; 710/73
(58) Field of Classification Search ............ 700/83, 700/7, 75 Z, 168, 84; 711/169; 345/158, 345/163; 710/73
See application file for complete search history.

(56) References Cited

U.S. PATENT DOCUMENTS

| | | | | |
|---|---|---|---|---|
| 5,097,252 A | * | 3/1992 | Harvill et al. | 340/540 |
| 6,380,923 B1 | * | 4/2002 | Fukumoto et al. | 345/156 |
| 6,515,669 B1 | * | 2/2003 | Mohri | 345/474 |
| 2002/0033803 A1 | * | 3/2002 | Holzrichter et al. | 345/158 |
| 2003/0038783 A1 | * | 2/2003 | Baughman | 345/163 |
| 2003/0137489 A1 | * | 7/2003 | Bajramovic | 345/158 |
| 2004/0108373 A1 | * | 6/2004 | Mehring | 235/145 R |

* cited by examiner

*Primary Examiner*—Kidest Bahta
(74) *Attorney, Agent, or Firm*—Rolf Fasth; Fasth Law Offices

(57) ABSTRACT

The method is for entering data into a computer device. A wearable device (10) is attaching to a hand (212). The device (10) has a lower unit (14) placed in a palm (106) of the hand and an upper unit (16) placed behind knuckles (17) of the hand and connected to the lower unit (14). A sensor (202) has transducers (260, 262, 264, 266, 268) in operative engagement with fingers (250, 252, 254, 256, 258). The sensor (202) has a position sensor (210) associated with an electronic cursor or sign (211) displayed on a screen (213). The fingers and/or hand are moved to switch the sensor (202) from a keyboard mode to a mouse mode. The hand (212) is shifted in a first direction to move the cursor (211) in the first direction on the screen (213).

10 Claims, 11 Drawing Sheets

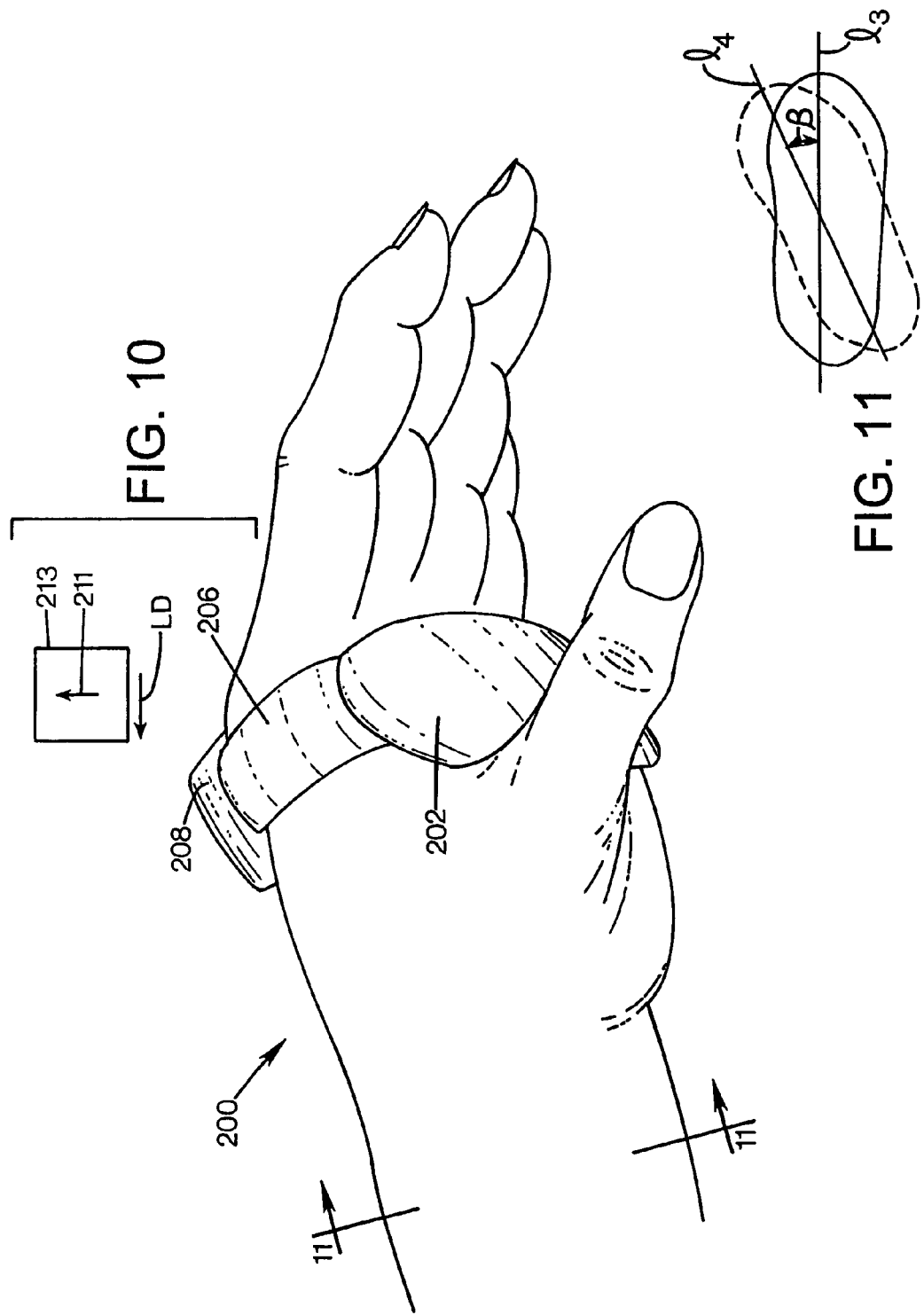

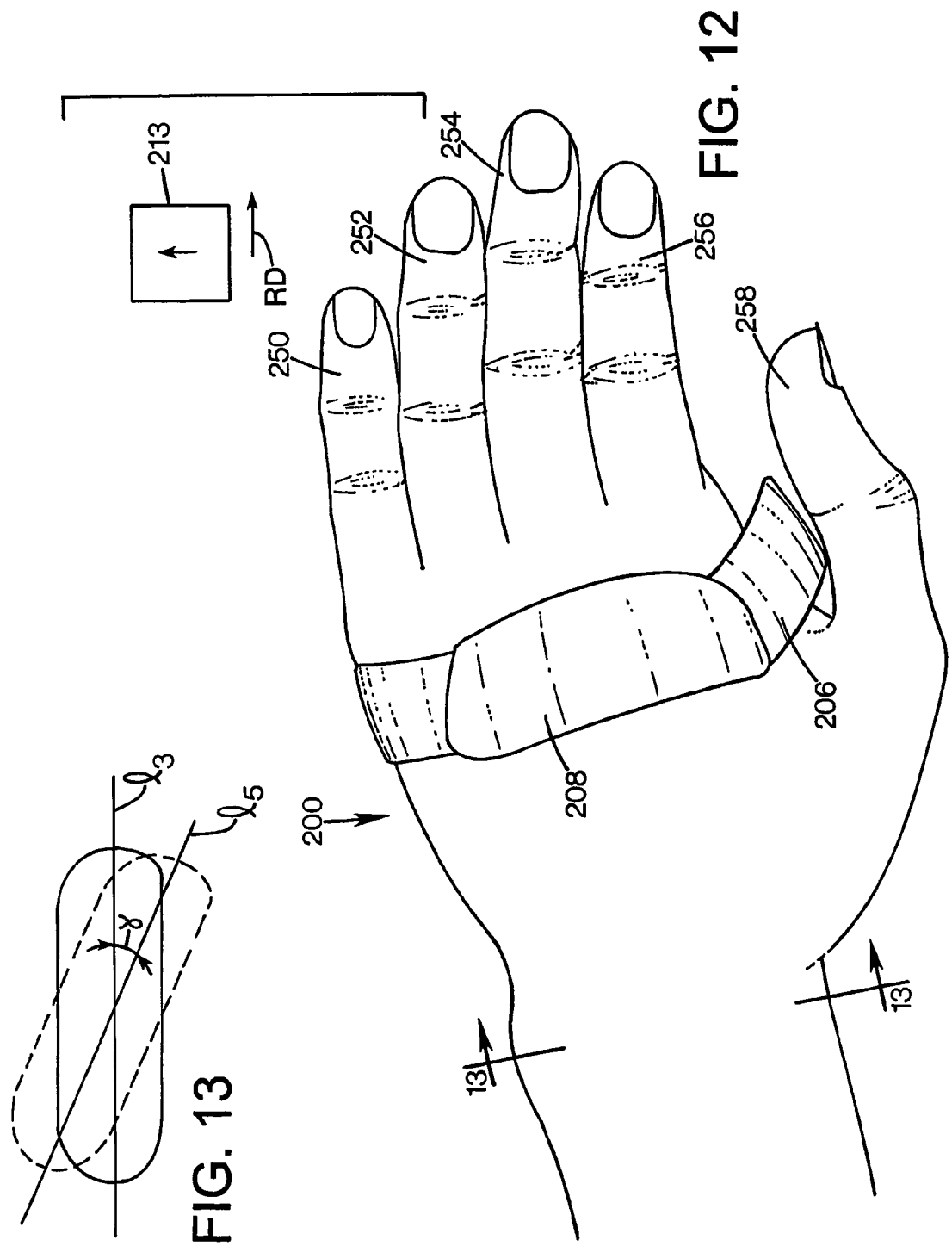

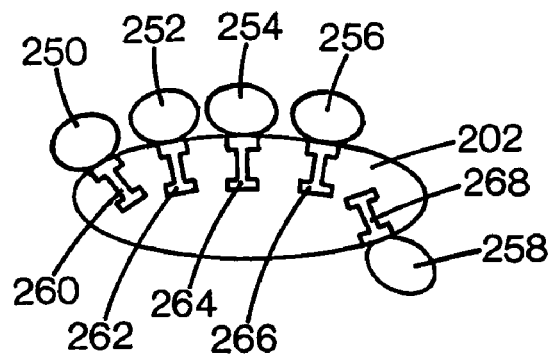
FIG. 14
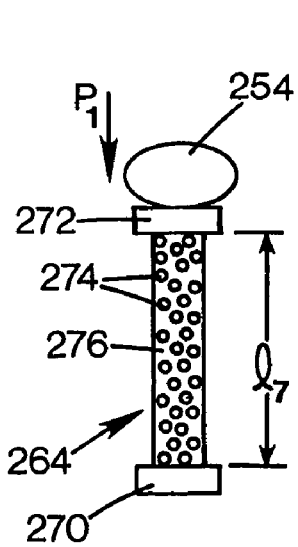
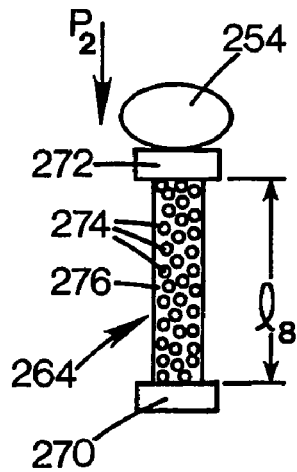
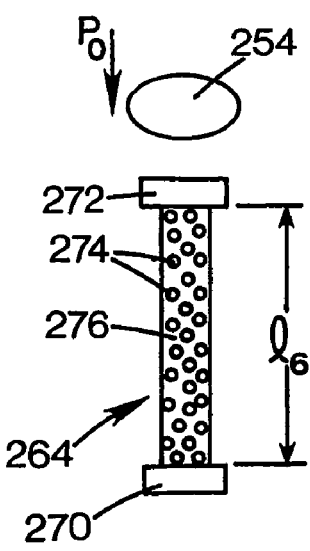
FIG. 15    FIG. 16    FIG. 17

DATA INPUT DEVICE

PRIOR APPLICATION

This application is a U.S. national phase application based on International Application No. PCT/US03/02904, filed 31 Jan. 2003, claiming priority from U.S. Provisional Patent Application No. 60/363,192 filed 12 Mar. 2002.

TECHNICAL FIELD

The present invention relates to a data input device that includes a position sensor that may be used to operate electronic cursors and other electronic devices.

BACKGROUND AND SUMMARY OF INVENTION

Conventional data input interfaces with computers most often requires keyboards. It is sometimes cumbersome to use keyboards especially if the computer or communication device is very small so that each letter or command button is also very small. For example, it is very inconvenient to enter text messages into a mobile phone or PDA because the devices are so small. In other situations, it is simply inconvenient to use a conventional keyboard because there is not sufficient room for the user to use the relatively large keyboards. This is particularly true when the user needs to enter data in a keyboard mode and to manipulate command by using mouse commands. There is a need for a convenient and reliable way of entering and manipulating data in a computer device. The method of the present invention provides a solution to the above-outlined problems. More particularly, the method of the present invention is a method for entering data into a computer device. A wearable device is attaching to a hand. The device has a lower unit placed in a palm of the hand and an upper unit placed behind knuckles of the hand and connected to the lower unit. A sensor has transducers in operative engagement with fingers. The sensor has a position sensor associated with an electronic cursor displayed on a screen. The fingers are moved to switch the sensor from a keyboard mode to a mouse mode. The hand is turned in a first direction to move the cursor in the first direction on the screen.

BRIEF DESCRIPTION OF THE DRAWINGS

FIG. 10 is a perspective view of an outwardly rotated hand with the hand-held device mounted thereon;

FIG. 11 is a cross-sectional view along line 11—11 of FIG. 10;

FIG. 12 is a perspective view of an inwardly directed hand with the hand-held device mounted thereon; and FIG. 13 is a cross-sectional view along the line 13—13 of FIG. 12;

FIG. 14 is a cross-sectional view of the sensor of the hand-held device;

FIG. 15 is a detailed view of a transducer with a finger in a rest position;

FIG. 16 is a detailed view of the transducer with the finger in an active position; and FIG. 17 is a detailed view of the transducer with the finger removed from the transducer.

DETAILED DESCRIPTION

Figure 1:
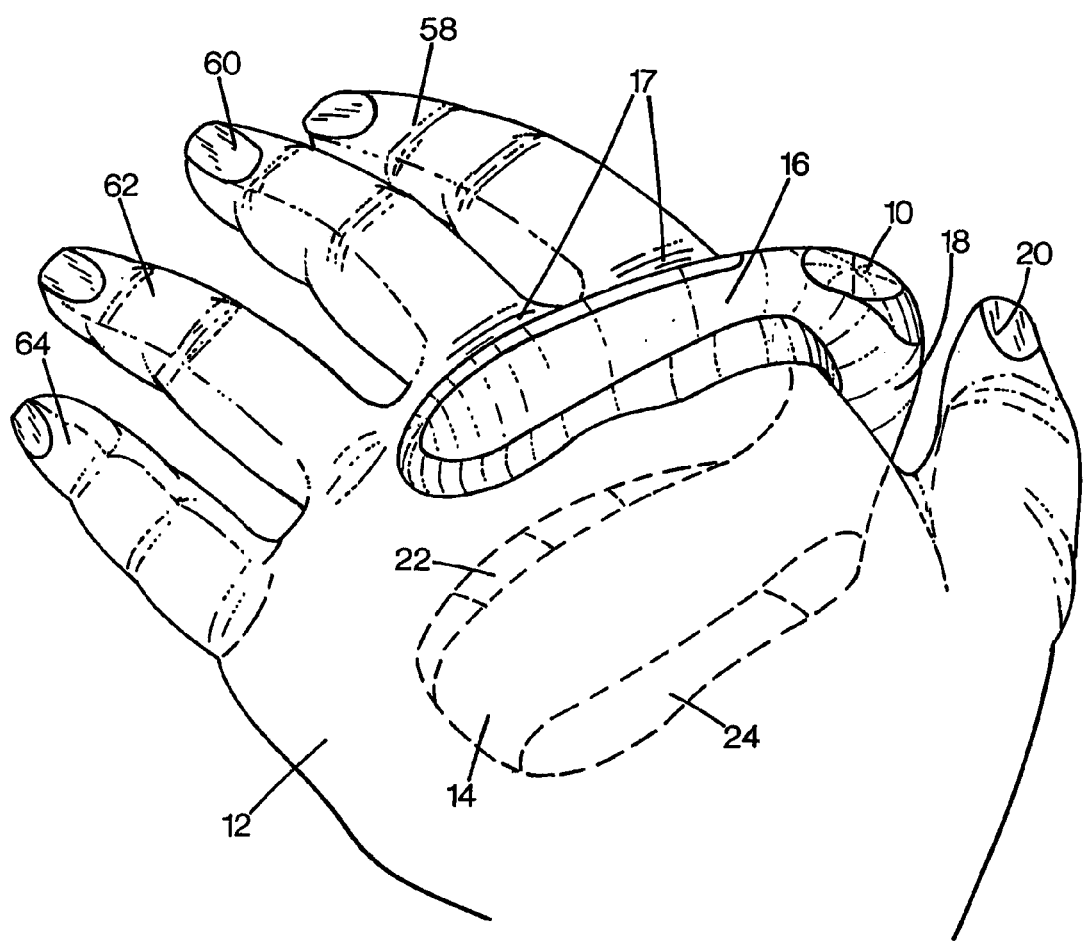
FIG. 1 is a perspective view of the hand-held device of the present invention mounted on a left hand.

With reference to FIGS. 1–6, the present invention is a data input device 10 for entering information into, for example, a computer connected to the device 10 without using a conventional keyboard. For example, the information may include text information such as a typing or remote control of certain functions of a machine. The device may be hand-held and a modified version of the device may be worn on the wrist or any other suitable place.

The device 10 may be mounted, for example, to a hand 12 so that a lower unit 14 is placed below palm and finger sections of the hand 12 and the upper unit 16 is placed above the hand 12 behind the knuckles 17. The unit 16 may include a PDA or a small display for showing, for example, what is being typed. Preferably, the units 14, 16 are connected by a connecting portion 18 disposed inside a thumb 20. The preferred position of the device 10 in the hand 12 is explained in detail below.

The lower unit 14 has a front rounded flexible portion 22 and a rounded rear portion 24 attached thereto. More particularly, the portion 22 has a groove 26 defined therein and lower and upper parts of the portion 22 may be applied against front edges 28 of a solid lower housing 30. Similarly, the portion 24 has a groove defined therein and the portion 24 may be applied to back edges 32 of the housing 30. The housing 30 has an upright back 34 having a cavity 36 defined therein for receiving a cylinder part 38. The housing 30 has also a short upright front 35. An upper end 40 of the back 34 has a groove 42 defined therein.

A sensor device 44 may be placed in the housing 30. The device 44 has a flexible printed circuit board 46 including a first protrusion 48, a second protrusion 50, a third protrusion 52, a fourth protrusion 54 and a fifth protrusion 56. The protrusions have sensors, these sensors can utilize for instance strain gauges, pressure transducers or moving coils, 49, 51, 53, 55, 57 that are sensitive to and continuously register movements of the protrusions. It is through this continuous measurement of the position of the protrusions that it is possible to draw the conclusion that a finger has moved. It is therefore not necessary to rely on only one movement to conclude that a movement has been made. Preferably, the protrusions are positioned below the palm 106 and a distal portion 97 of the hand 12 while the protrusion 54 extends towards an index finger 58, the protrusion 52 extends towards a middle finger 60, the protrusion 50 extends towards a ring finger 62 and the protrusion 48 extends towards a little finger 64. However, it is possible to use more or fewer than five sensors for sensing the movements of the fingers. The present invention is not limited to one sensor per finger since the system considers the movement of all the fingers, as explained below. Other sensors than strain gauges may also be used in the system. These may register movements or accelerations depending upon the sensor technique that is used. As an example, the device can be equipped with one or several accelerometers. With the use of three dimesnions all movements of the hand can be detected. Using more than three accelerometers it is also possible to measure rotations of the hand.

As indicated above, the board 46 may be used to register movements of the fingers of the hand 12 and movements of the hand both as translations and as rotations. Preferably, the protrusions 48, 50, 52, 54 and 56 are easier to bend compared to a central section 66 of the board 46. The protrusions may be separated by cavities so that the movement of one protrusion is not unduly affected by the movement of an adjacent protrusion. However, as explained below, the device 10 takes the movements of all the fingers and some of the degrees of freedom for the hand into account before it determines which letter or command the user intended to activate. In this way, not only the movement of the active finger but also the movement of adjacent fingers and the hand are used when determining which letter or command the user intended.

Figure 2:
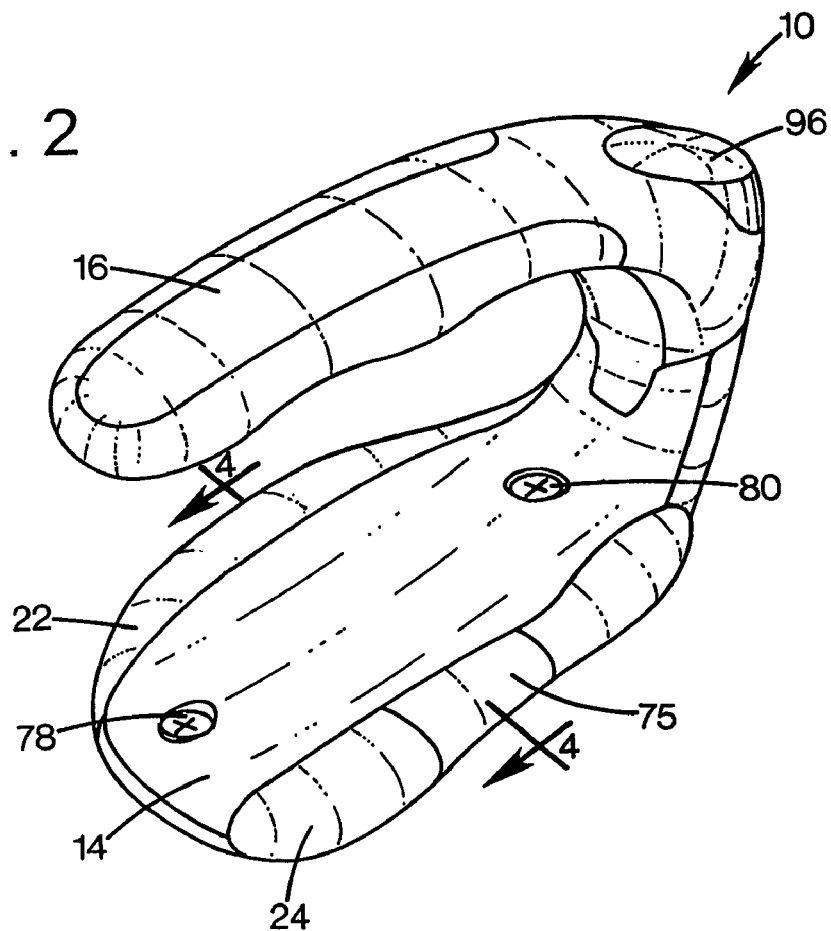
FIG. 2 is a perspective view of the hand-held device of FIG. 1.
Figure 4:
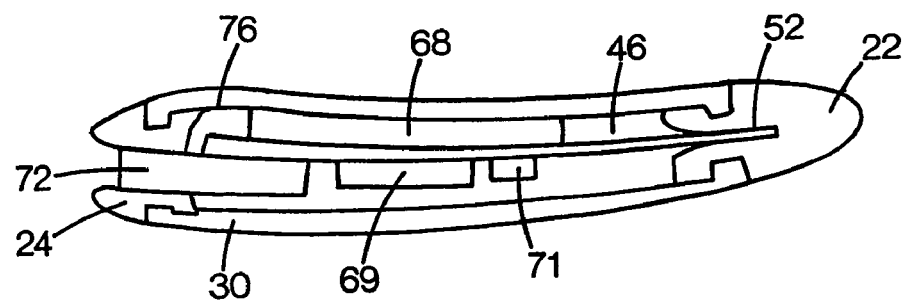
FIG. 4 is a cross-sectional view of the hand-held device along line 4—4 of FIG. 2.
Figure 3:
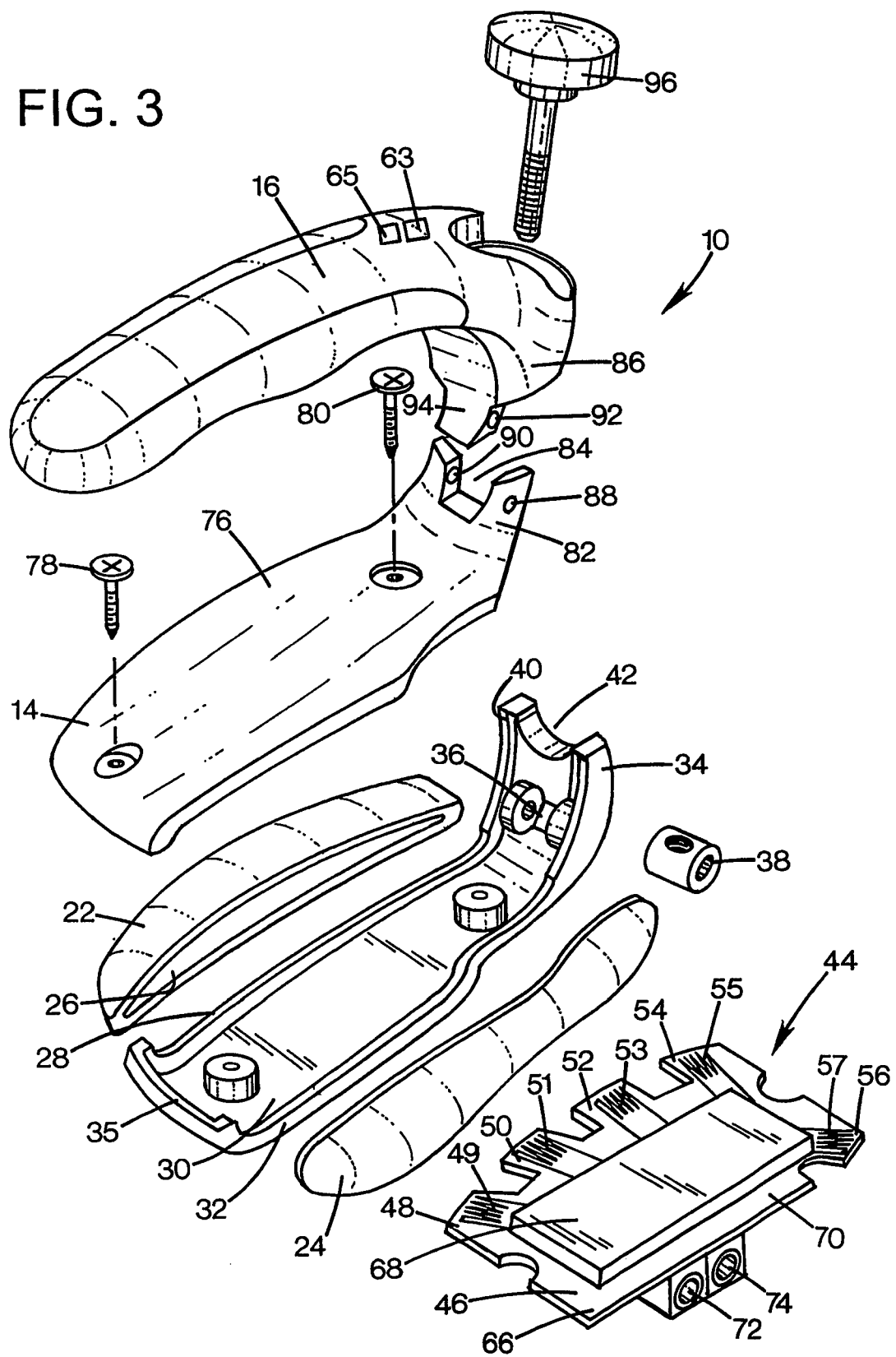
FIG. 3 is a perspective exploded view of the hand-held device of FIG. 2.

The central section 66 has a stiff or bendable battery unit 68 that is in operative engagement with a computer-processing unit 69 on the section 66. The invention is not limited to battery units and any suitable power source may be used. The section 66 may also have a converter 71 that converts analog signals to digital signals. The device 44 is dimensioned so that it may fit on top of the housing 30 and between the portions 22, 24 when the portions 22, 24 are attached to the housing 30. The protrusions 48, 50, 52, 54 may be inserted into the groove 26 of the portion 22 and a back edge 70 of the board 46 may be captured between the housing 30 and a top cover 76. The sensor device 44 has a power input connector 72 and a communication port 74 disposed below and attached to the board 46. It should be noted that the connector 72 and the port 74 may be integrated into one unit. The connector 72 may be used to recharge the battery 68 or to power the device 10 and the port 74 may be used to connect the device 10 to a computer or any other suitable device that can receive signals produced by the device 10. The connector 72 and port 74 may be hidden behind an openable lid 75, as best seen in FIG. 2. Wireless technology such as bluetooth, radio technology or any other radio technology or any other suitable wireless technology may also connect the device 10 to a computer.

The device 10 has the cover 76 placed on top of the sensor device 44 and attached to the housing 30 by screws 78, 80 to firmly hold the device 44 between the housing 30 and the cover 76. The various pieces may also be adhered together so that the screws are not necessary. The cover 76 has an upright back 82 having a cavity 84 defined therein. The upper unit 16 has a back 86 that may be attached to the back 82 in the cavity 84 thereof. The upper unit 16 may be replaced by a strip. The back 86 may be pivotally attached to the back 82 by inserting a pivot pin through openings 88, 90 of the back 82 and an opening 92 of a lower end 94 of the back 86. An adjustment screw 96 may be attached to the device 10 to adjust the gap between the units 14, 16 to accommodate the device 10 to different hand sizes. If desired, the device 10 may be attached directly to a PDA.

Figure 5:
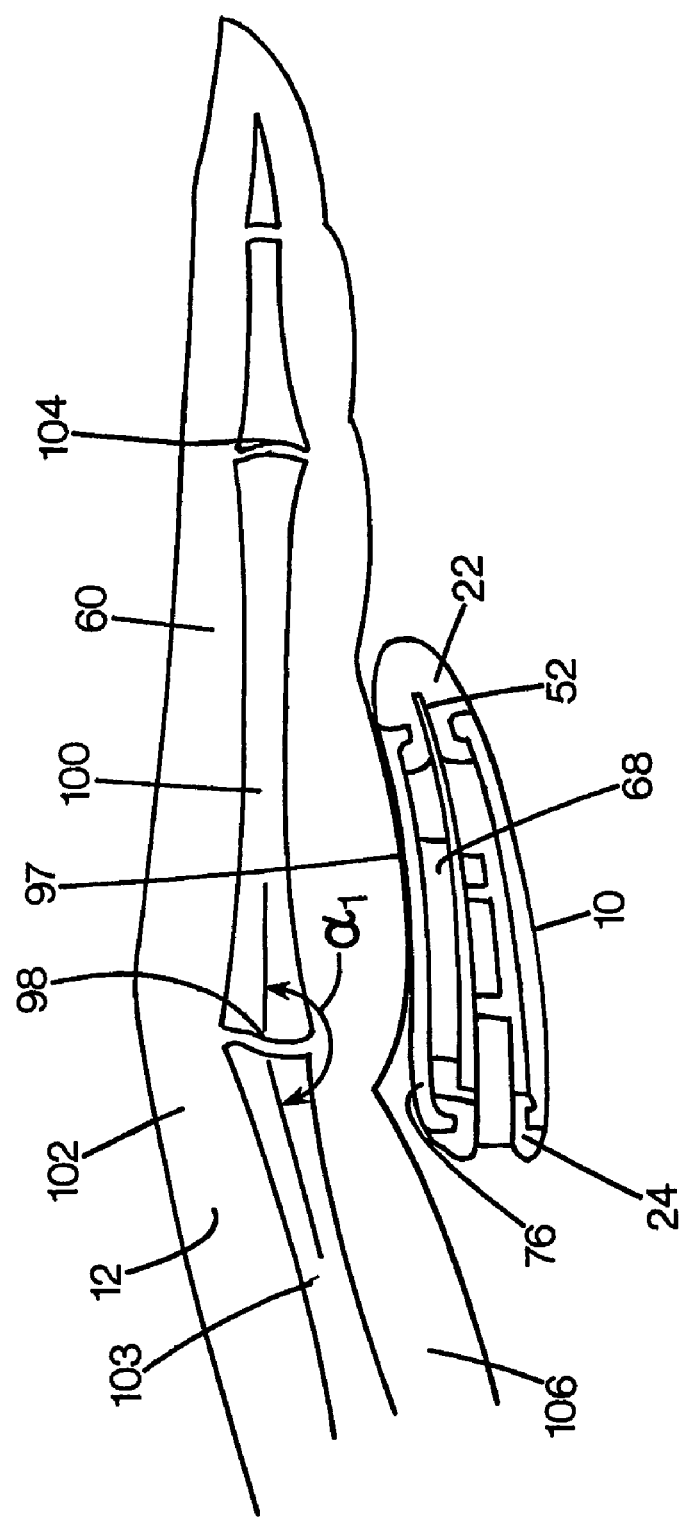
FIG. 5 is a cross-sectional view of the hand-held device with a finger resting on the device.
Figure 6:
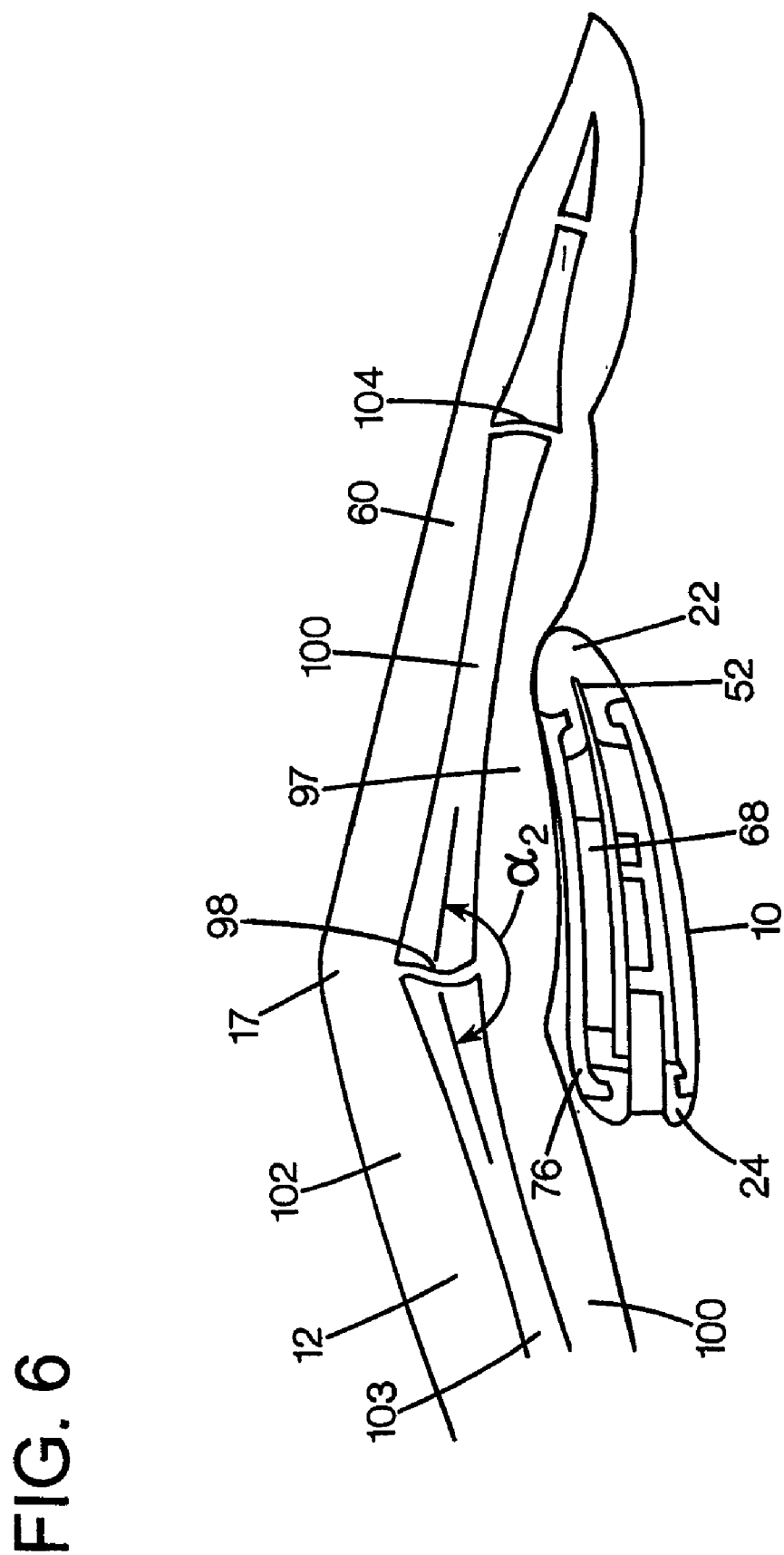
FIG. 6 is a cross-sectional view of the hand-held device with a finger applying a pressure on a front end of the hand-held device.

FIGS. 5–6 show a hand and a finger, such as a distal portion 97 of the palm 106 bearing against the device 10 and a finger 60. More particularly, the device 10 is placed below a metacarpophalangeal (MCP) joint 98 so that the device 10 may register movements of the finger portion 100 relative to the metacarpalia bone 103 of the hand 12. Preferably, the portion 100 rests on the cover 76 and the flexible portion 22. The portion 22 should be positioned between the joint 98 and a finger joint 104 so that the portion 22 is positioned about half way along the promixal phalanx and beyond the metacarpophalangeal joint of each finger. When the portion 100 is moved downwardly relative to the bone 103 to reduce an angle alpha 1 (see FIG. 5) to an angle alpha 2 (see FIG. 6), the portion 22 is deformed proportionally to the changes in the metacarpophalangeal joint angle and the protrusion 52 is bent slightly and proportionally in a downward direction. More particularly, movements of the metacarpophalangeal joint 98, disposed between the proximal phalanx 100 and the metacarpalia bone 103 of the hand 12, is measured. For example, when the middle finger 60 moves downwardly by a movement in the metacarpophalangeal joint 98, the portion 22 bears against the palm portion 97 of the proximal phalanx of the middle finger 60 and the portion 22 is deformed proportionally to the changes in size of the metacarpophalangeal joint angle so that the sensor 53 can continuously register the different positions. The angle alpha 1 may be close to 180 degrees or slightly less. The sensor 53 registers the bending of the protrusion. It is to be understood that the finger 60 is used as an example and the same principle applies to all the protrusions and fingers.

Because the portions 22, 24 are made of a flexible material, the protrusions 48, 50, 52, 54 and 56 are permitted to move when the portion 22 is moved by the fingers 58, 60, 62, 64 and the portion 24 is moved by the thumb 20. The device 10 also may have an on/off function 63 and a pause function 65 built in. It may also be possible to deactivate the device 10 by a certain finger or hand movement or by not using the device for a certain time.

As mentioned above, when the device 10 of the present invention is used as a text input device, it is not necessary that the user is actually using a conventional keyboard. It is sufficient to move the fingers and hand as if the user is typing such as by pressing the fingers against a table surface or thigh to move the proximal phalanx of a finger and thereby changing the angle of the metacarpophalangeal joints of the hands. Because the sensors are continuously sending signals and these signals are continuously measured, it is possible pre-set a signaling level that will trigger an event that a finger impact has occurred. It is important to note that it is not necessary for the user or operator to hit a specific spot on the table or whatever surfaces the fingers are hitting. It is enough to make a sufficient movement in the metacarpophalangeal joints and an indication of direction of the movements of the hand to transmit a signal regardless where on the table surface the fingertips hit.

It may also be possible to adjust the device 10 so that the sensors are placed on top of each finger to measure the movements of the joints and fingers. One advantage of having the device 10 on the back of the hand is that it frees up the inside of the hand for other tasks. In this way, all the measurements of the finger movements are performed on the back of the hand and the fingers. For certain sensor techniques, another advantage of placing the sensors on top of the fingers may be that it could be easier to register changes in the angle of the metacarpophalangeal joints of the fingers.

Figure 7:
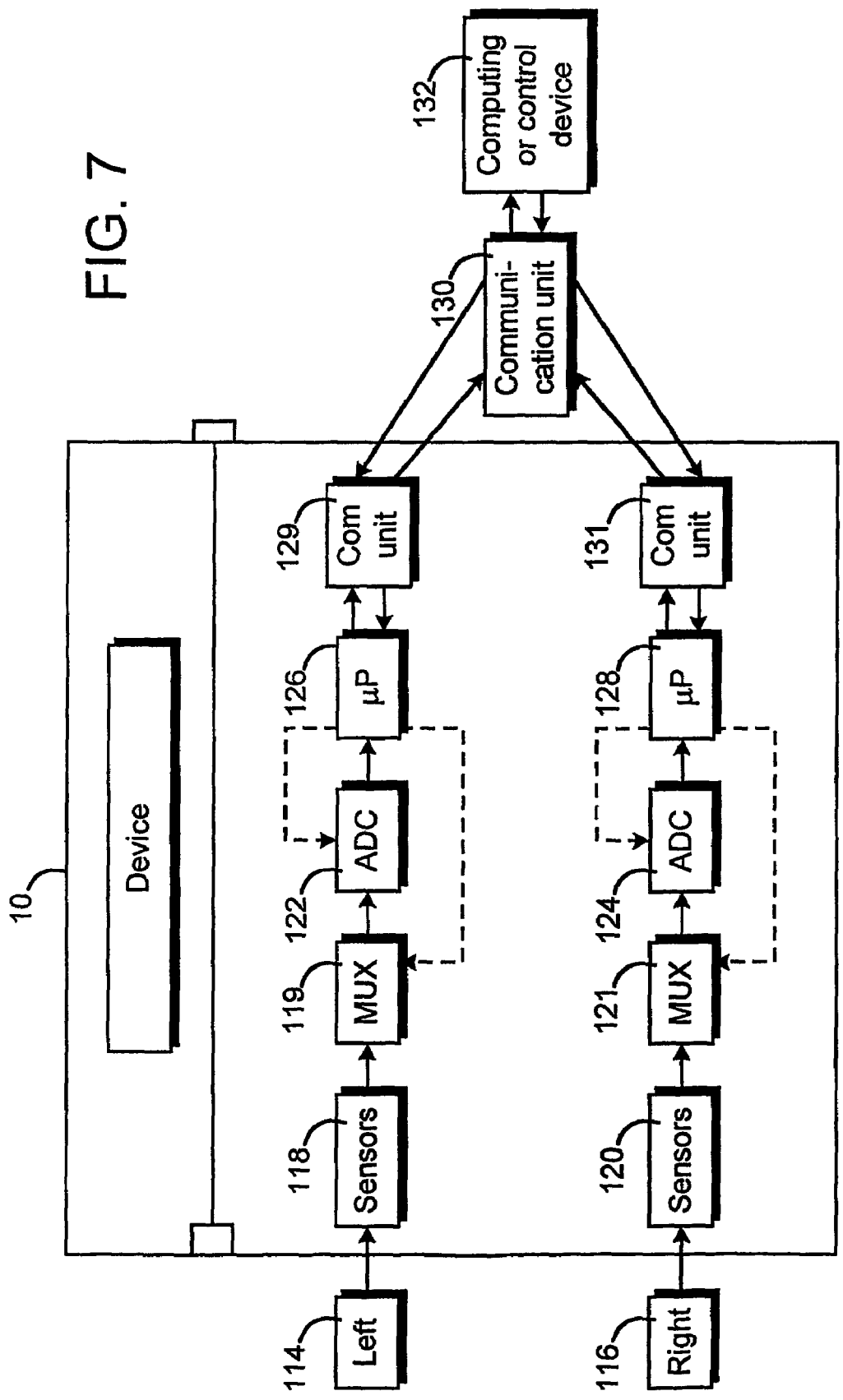
FIG. 7 is a schematic flow diagram of the information flow of the present invention.

FIG. 7 is a schematic diagram showing the information flow within the present invention. The device 10 is connected to a left side portion 114, corresponding to the fingers of a left hand of a user, and a right side portion 116, corresponding to the fingers of a right hand of the user. The portions 114, 116 are in operative engagement with sensors 118, 120, respectively, to activate the sensors so that the sensors 118, 120 may continuously send signals, as a result of registered movements by the portions 114, 116. The sensors may correspond to the protrusions 48, 50, 52, 54, 56 on the board 46. The sensors 118, 120 continuously send signals to multiplexer units 119, 121, respectively. The units 119, 121 are hardware devices that enable two or more signals to be transmitted over the same circuit at the same time by temporarily combining them into a single signal. On the receiving end, the signals are divided again by a demultiplexer that may be part of the microprocessors 126, 128. The processors may guide and distribute the tasks as is symbolized with dashed lines in FIG. 7. Values are continuously being sent from the sensors to the multiplexer units that in turn send instructions to both the sensors and the multiplexer units. The analog digital converters 122, 124, respectively, convert the analog signals from the sensors to digital signals before the signals are forwarded to the microprocessors 126, 128. The micro-processors 126, 128 process the signals in mathematical operations, such as an artificial neural network system, before the signals are sent via a communication unit 130 to a computing device 132 such as a computer, PDA, telephone or any other target device. Communication units 129, 131 are connected to the microprocessors 126, 128, respectively. The units 129, 131 are then connected to the communication unit 130. The unit 130 may be connected to the receiver via any suitable communication technology such as infrared, sound, cable or radio-transmission. The computing device 132 may then display the text if the device 10 is used as a typing device.

The artificial neural network may remove certain letter possibilities as very unlikely and the language processor may carry on the analysis to finally determine which letter and words are intended by the user. The artificial neural network is particularly useful in determining which letter is intended by reviewing columns of letters. The module is quite efficient at determining sideways movement using the sensors for hand movements such as the difference between the letter "f" and the letter "g" on a conventional key board because the letters are beside one another and the letter "f", for example, is further away from the thumb compared to the letter "g." The module may also learn how most people type "f" compared to "g" by letting a large number of people use the system and record how most people use all the fingers when certain letters are intended to be typed.

The language processor may also have an artificial neural network module. This module analyses the movement of not only the finger that is activated but also the other fingers and the whole hand when determining which letter or command the user intended. The module analyzes a pattern of signals from all the fingers and all hand-sensors and may filter away unlikely letters. The module may also store unusual finger movement patterns that are used for certain letters. The module may also learn from the user's corrections once the user sees what is being displayed. In this way, the module may be trained to recognize which letter the user intends by analyzing the movements of all the fingers in relation to one another. By using the artificial neural network, it may be possible to determine which letter the user, without using a language processor, intends. The module may be set so that only certain values are treated as acceptable letters and signs. In this way, the number of possible letters is drastically reduced before the language processor starts the analysis. The user may also set the input speed and whether the user is using the fingers to create a hard or relatively soft impact on a surface because the movement pattern may change depending upon how fast the user is typing and how hard the fingers are hit against a surface. It may also be possible to keep separate networks for letters and numbers. Predefined finger and/or hand movements may be used to replace the function of a computer mouse. The computing device 132 may include a language processor that may elaborate input streams into words. The language processor may also be used to compose words into sentences and to display the most likely sentences. The language processor may propose possible corrections required if the sentence has ambiguities. When using a conventional keyboard, each finger may be used for six or more characters including punctuation marks and other signs. Since the dominant thumb is most often used for the space bar, the less dominant thumb may be used to activate a backspace command.

Each finger stroke may be analyzed both on a lexical level and on a syntactic level. The language processor may also analyze the frequency ranking level. The lexical analysis may include pre-matching any three letters into a tri-gram dictionary. In other words, the language processor defines a tri-gram of three letter sequences that exist in at least one word in the English dictionary. One goal of the tri-gram matching is to minimize the number of searches in a dictionary of English words and the speed up the processing time because the three letter combinations that do not exist in the English language are eliminated. Words that are shorter than three words may be directly matched without using the tri-gram analysis.

When the words have more than three letters it is necessary to merge through sliding tri-grams. For every sequence of three letters, the process may establish all the possible trigrams that can be found in a dictionary database. Any previous trigrams may be matched with the current tri-grams and the results are stored. These steps are repeated until an empty space is encountered. When the tri-gram analysis is completed, the language processor conducts a dictionary match that results in a set of possible words. Every word in the set is then mapped into possible phrases. The resulting phrases may then be matched against possible known sentence structures.

As soon as a space is encountered, the language processor knows the length of the word. The language processor may also know which finger was used for the first letter. Groups of words that match these criteria may be ordered according to the letter configuration of a conventional keyboard, i.e., a,q,z,s,x,w,c,d,e,b,f,g,r,t,v, b,h,j,m,n,u,y,i,k,l,o,p.

The language processor may also analyze the typed words depending upon whether the word is a noun, verb, auxiliary, preposition etc. Some words may belong to several syntactic groups. For example, the word "can" is both a noun and an auxiliary. The language processor may determine which syntactic group should be used based on where in the sentence the word is used. When the language processor cannot determine which syntactic rule applies, the language processor may have default setting to display the most frequently used type of words. In most cases, a sequence of finger strokes does not produce one word only but a set of words. The intended word type may be selected according to the phrase structure grammar and the word frequency.

The phrase structure grammar may employ phrases to describe the syntactic structure of a sentence by describing the sentence as a phrase structure. The phrase structures are combinations of words, such as determiner-nouns and auxiliary verbs. The structures describe the word types that make up a particular phrase. It considers the syntactic context of words by matching the adjacent word types against the phrase structures. The syntactic processor may use a simple grammar of phrase structures that could be included in a database. It parses through the input sentence to match each sentence word against the phrase structure that results in a description of phrases and word types in the sentence. After the input sentence is parsed, some sentence words could remain unmatched when, for example, the word is misspelled or the words are not represented in a phrase structure. This means that there is no phrase structure that matches the input sequence of word types. In this case, the outcome for every word in the sentence will be the most frequent word for each word set. The language processor may also simply bypass the word.

When a sentence is matched, there could still be more than one possible sentence. The frequency of every word, among the ones matching at least one sentence structure, may be used to determine which words should be displayed. The sentences may therefore be ranked based on the frequency of occurrence of each word. The sentences that have the words with the highest total score may be selected and displayed. When the language processor encounters punctuation, it may be programmed to consider the sentence as being finished and starts to perform the syntactical analysis and the highest ranked sentence may be displayed. The language processor may also conduct a semantic analysis of the sentence so that the meaning of the words is considered.

In an alternative embodiment, a remote sensor may recognize and register the sound created by the fingers hitting a surface. The sensor may distinguish between the different fingers because the fingers have, for example, different lengths and thickness that create different sound vibrations when the fingers hit a surface.

Figure 8:
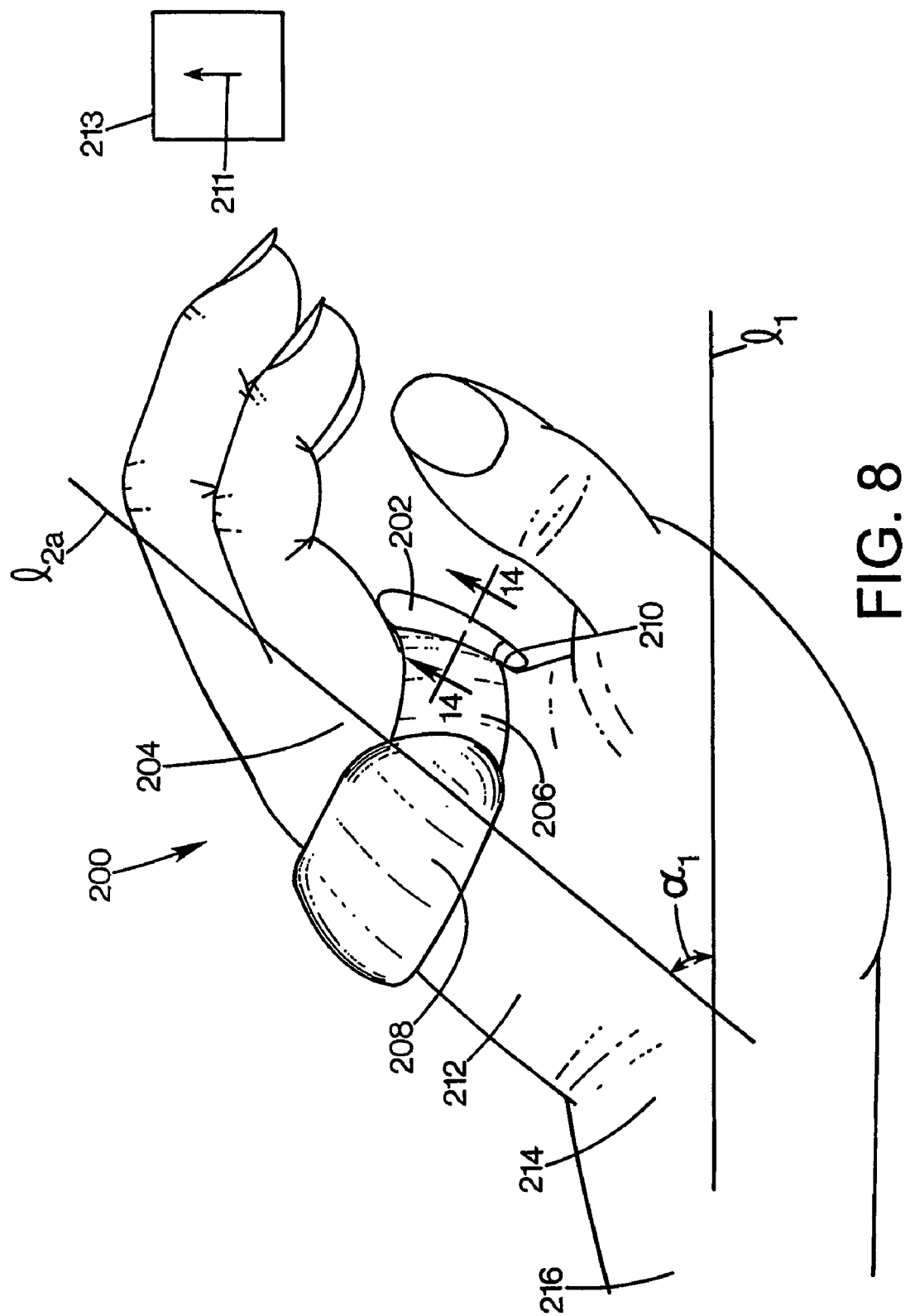
FIG. 8 is a perspective view of an upwardly directed hand with the hand-held device mounted thereon.

With reference to FIG. 8, an alternative data input device 200 may have a sensor unit 202 disposed below the metacarpophalangeal joints 204 of the fingers. A stretchable band 206 is attached to the sensor unit 202 and a plate unit 208. The sensor unit 202 has a position sensitive sensor 210, such as an accelerometer or inclinometer that is sensitive to the position of a hand 212 to which the device 200 is attached. The sensor 210 may also be located in the plate unit 208.

The sensor 210 may be connected to a movable electronic cursor or sign 211 or other movable signs displayed on a computer screen 213. The sign 211 could also be a target or activation button of a computer game or an electronic document or any other suitable application. Certain commands or finger movements may be used to switch the unit 202 from a keyboard mode to a mouse mode. The keyboard mode may mean that the device is used to type letters and other commands, as described above. The mouse mode may make it possible to perform functions that are normally carried out by a conventional mouse device such as moving a cursor and clicking on commands on the computer screen 213. For example, the unit 202 may be set up so that the contacts of the transducers have light emitting diodes and the unit 202 is in the keyboard mode when the diodes see each other and in the mouse mode when the diodes do not see each other or are blocked from each other. Of course, the unit 202 may be put into the mouse mode regardless of the status of any light emitting diodes.

When the unit 202 is in the mouse mode, the index finger 256, or any other finger, may be used to activate the commands that correspond to the right button on a conventional mouse that is set up for a left-handed person. The middle finger 254 may be used for commands that correspond to the left button. Of course, the unit 202 may be set up in any way that is suitable to the user. The remaining fingers 250, 252 and thumb 258 may be used for other special mouse commands when the unit 202 is in the mouse mode. The unit 202 may be switched back to the keyboard command by a certain command or finger movement to deactivate the mouse mode.

The hand 212 may be turned upwardly at a wrist 214 so that the hand 212 extends along a line 12a that forms an angle alpha1 relative to a line 11 parallel to the wrist 214 and the fore-arm or upper arm 216. In other words, the hand 212 may be turned or moved relative to either the forearm or the upper arm of the user. The upward movement of the hand 212 may move the cursor in a corresponding upward direction when the unit 202 is in the mouse mode. The speed of the cursor may be determined or changed by changing the angle alpha1. The greater the angle alpha1 the faster the cursor may move on the screen 213. By reducing the angle, the cursor may slow down until the hand is in a horizontal position and the cursor stops.

Figure 9:
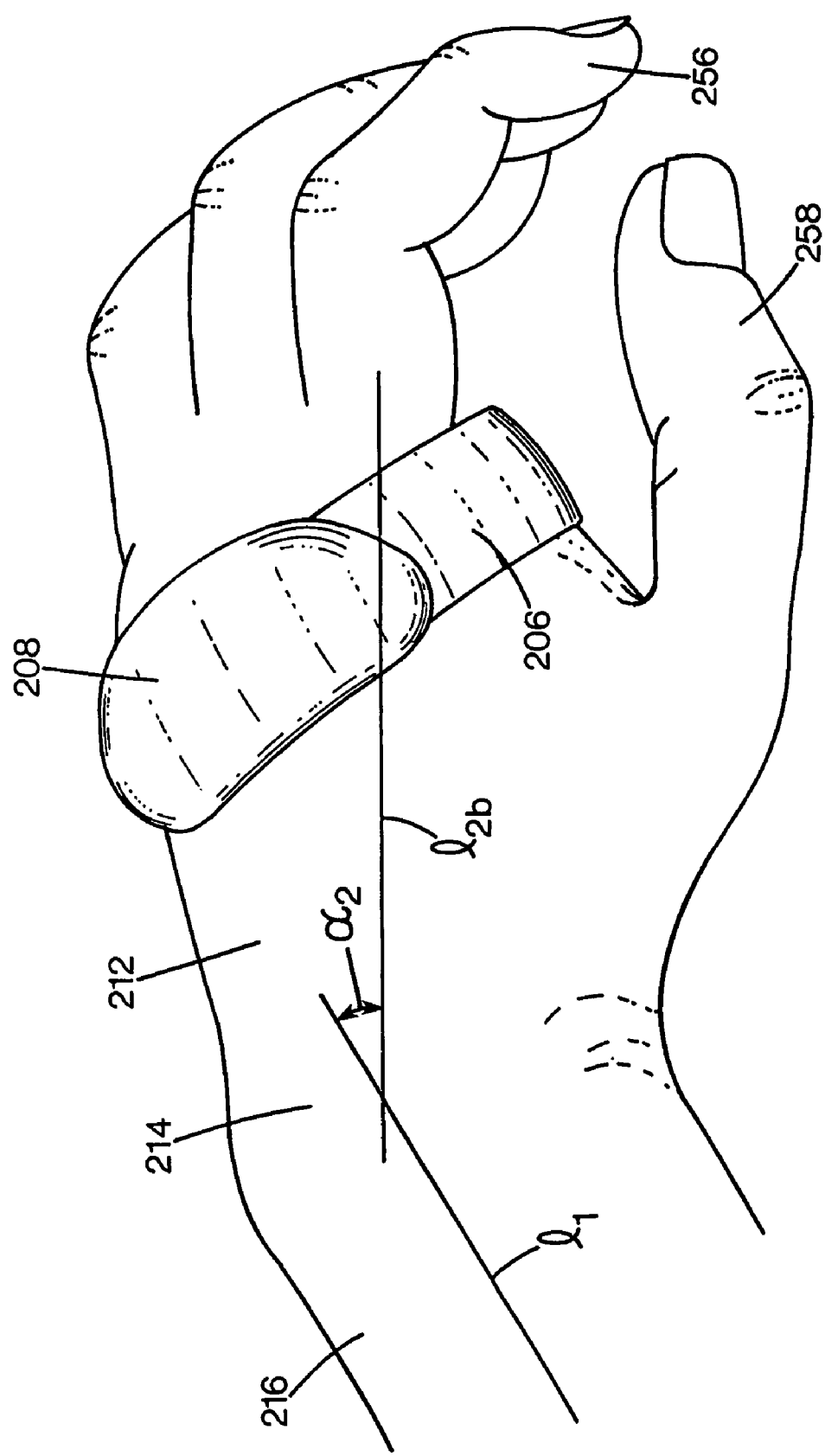
FIG. 9 is a perspective view of a downwardly directed hand with the hand-held device mounted thereon.

FIG. 9 shows the hand 212 turned downwardly so that the hand 212 extends along a line 12b that forms an angle alpha2 relative to the horizontal line 11. Similar to the upward movement of the hand, the downward movement of the hand 212 may move the cursor in a corresponding downward movement on the screen. The speed of the cursor may be controlled by the angle alpha2.

FIGS. 10–11 show the hand 212 in an inward rotated position so that the hand 212 is aligned along a sloping line 14 to move the cursor 211 in a left direction LD on the computer screen 213. The line 14 forms an angle beta relative to a horizontal rest position 13. FIGS. 12–13 show the hand 200 in an outward rotated position so that the hand 212 is aligned along a sloping line 15 to move the cursor 211 in a right direction RD on the computer screen 213. The line 15 forms an angle gamma relative to the horizontal rest position 13. The left or right movement of the cursor 211 may be stopped by moving the hand 212 so that the hand 212 is aligned with the horizontal position 13. The hand 212 has fingers 250, 252, 254, 256 and the thumb 258 that may be used for typing commands when the unit is in the keyboard mode or for certain mouse commands when the unit is in the mouse mode.

FIG. 14 is a detailed cross-sectional view of the flexible and resilient sensor unit 202 along line 14—14 of FIG. 8. More particularly, the unit 202 has pressure transducers 260, 262, 264, 266 and 268 that are aligned below the fingers 250, 252, 254, 256 and the thumb 258, respectively.

FIGS. 15–16 are detailed views of one possible embodiment the transducer 264 that has been selected as an illustrative example. FIG. 15 is a high-resistance start position and FIG. 16 is a low resistance active position. The other transducers 260, 262, 266 and 268 are preferably identical to the transducer 264. The transducer 264 has a first contact 270, such as a conductive metal plate, and a second contact 272, such as a conductive metal plate. The contacts 270, 272 may be connected to a circuit board.

A conductive material 274, such as carbon grains, is disposed between the contacts 270, 272. The material 274 may also include steel/metal grains or conductive polymer grains. The grains are more or less in contact with one another and are embedded by a non-conductive flexible material 276 such as a silicone material. An important feature of the transducer 264 is that it changes its resistance when a length $l_7$ of the transducer 264 is reduced to a shorter length $l_8$. The conductivity is increased the more the first contact 270 and second contact 272 are pressed towards one another because there is an increased contact surface between the carbon grains 274 that results in better conductivity. The difference between the length $l_7$ and the length $l_8$ may be in the range of 0.1–0.2 millimeters or any other suitable length difference as required. The resistance change between the contacts 270 and 272 may be measured. The resistance change should be linearly or non-linearly proportional to the amount of compression of the transducer 264.

It should be understood that there, preferably, is some conductivity even when the transducer 264 is in the high resistance start position, as shown in FIG. 15, because the weight of the finger 254 puts some pressure P1 on the transducer 264. In this way, it is possible to measure when the finger 254 is in the rest position, as shown in FIG. 15, and the active position, as shown in FIG. 16, when the finger 254 put a higher pressure P2 on the transducer 264. It is also possible to determine when the finger 254 is lifted or moved away from the contact 272 because the resistance is increased to a value that is higher than the rest or start resistance. FIG. 17 shows the finger 254 lifted away from the contact 272 to form a gap therebetween and so that the finger exerts a zero or no pressure P0 on the transducer 264 and the length of the transducer is $l_6$ that is longer than the length $l_7$. In this way, it is possible to register when the finger is in the rest position and some pressure is put on the transducer (see FIG. 15), the active position when a higher pressure is put on the transducer to deform it (see FIG. 16) and the removed position when the finger is removed from the transducer (FIG. 17) and no pressure is put on the transducer.

As described below, the unit 202 measures the movements of not only one finger but all the fingers so that the movement pattern of all fingers are measured and analyzed. For example, when the user is activating the finger 254 to press the letter "d", the other fingers also move in a pattern that is characteristic for the activation of the letter "d". By analyzing the movement of all the fingers, the accuracy of determining which letter the user intended is improved. This means that the movements of all the fingers 250–258, and consequently the movements of all the transducers 260–268, are analyzed. The pressure transducers in FIGS. 14–17 are preferably sensitive to the actual pressure. An alternative and possible embodiment may be based on a change in pressure such as a piezoelectric transducer.

While the present invention has been described in accordance with preferred compositions and embodiments, it is to be understood that certain substitutions and alterations may be made thereto without departing from the spirit and scope of the following claims.

We claim:

1. A method of entering and manipulating data in a computer device, comprising:

providing a wearable device and attaching the wearable device to a hand, the device having a lower unit placed in a palm of the hand and an upper unit placed behind knuckles of the hand and connected to the lower unit, the lower unit having a sensor attached thereto, the sensor having transducers in operative engagement with fingers, the sensor having a position sensor;

associating the position sensor with an electronic sign displayed on a screen;

moving one of the fingers without touching a surface to a mode change position;

the movement activating the position sensor to sense the mode change position;

the position sensor switching the sensor from a keyboard mode to a mouse mode; and turning the hand in a first direction to electronically move a sign on a screen in the first direction without the hand traveling the first direction.

2. The method according to claim 1 wherein the method further comprises moving the hand in a direction to move the sign in the same direction.

3. The method according to claim 1 wherein the method further comprises moving one of the fingers to engage one of the transducers to reduce a distance between the finger and a base of the sensor.

4. The method according to claim 1 wherein the method further comprises increasing a velocity of the sign by increasing an angle (alpha$_1$) relative to a line ($l_1$) parallel to a forearm.

5. The method according to claim 4 wherein the method further comprises slowing down and stopping the sign by moving the hand to a position that is substantially parallel to the line ($l_1$).

6. The method according to claim 1 wherein the method further comprises turning the hand in a downward position relative to a line ($l_1$) parallel to a forearm to move the sign in the downward position.

7. The method according to claim 6 wherein the method further comprises increasing a velocity of movement of the sign by increasing an angle (alpha$_2$) relative to the line ($l_1$).

8. The method according to claim 1 wherein the method further comprises measuring a rotational movement of the hand.

9. The method according to claim 3 wherein the method further comprises determining which command or letter is typed by analyzing a conductivity change of the transducers.

10. The method according to claim 9 wherein the method further comprises analyzing movements of all fingers when determining which command, letter or other symbol is typed.

* * * * *